US012744333B2

(12) United States Patent
Sun et al.

(10) Patent No.: US 12,744,333 B2
(45) Date of Patent: Sep. 22, 2026

(54) RADIATING ELEMENT FOR BASE STATION ANTENNA AND BASE STATION ANTENNA

(71) Applicant: Outdoor Wireless Networks LLC, Claremont, NC (US)

(72) Inventors: Bin Sun, Suzhou (CN); Changfu Chen, Suzhou (CN); Cheng Xue, Suzhou (CN); Jian Zhang, Suzhou (CN); Pengfei Guo, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 98 days.

(21) Appl. No.: 18/815,967

(22) Filed: Aug. 27, 2024

(65) Prior Publication Data

US 2025/0079724 A1 Mar. 6, 2025

(30) Foreign Application Priority Data

Aug. 28, 2023 (CN) ......................... 202311092838.3

(51) Int. Cl.
*H01Q 21/26* (2006.01)
*H01Q 1/24* (2006.01)
*H01Q 21/30* (2006.01)
*H01Q 23/00* (2006.01)

(52) U.S. Cl.
CPC ............ *H01Q 21/26* (2013.01); *H01Q 1/246* (2013.01); *H01Q 21/30* (2013.01); *H01Q 23/00* (2013.01)

(58) Field of Classification Search
CPC ........ H01Q 21/26; H01Q 1/246; H01Q 21/30; H01Q 23/00; H01Q 1/521; H01Q 1/38; H01Q 1/36; H01Q 21/06; H01Q 21/28
See application file for complete search history.

(56) References Cited

U.S. PATENT DOCUMENTS

2018/0323513 A1* 11/2018 Varnoosfaderani .......................... H01Q 21/062
2019/0181557 A1 6/2019 Isik et al.
2023/0299485 A1* 9/2023 Sundararajan ........... H01Q 5/42 343/702

* cited by examiner

*Primary Examiner* — Hoang V Nguyen
(74) *Attorney, Agent, or Firm* — Myers Bigel, P.A.

(57) ABSTRACT

A radiating element for a base station antenna that is operable in a first frequency band. The radiating element comprises a radiator that includes a first radiating arm and a second radiating arm. At least one of the first radiating arm and the second radiating arm comprises: a first conductive region; a second conductive region spaced apart from the first conductive region; and a first inductive trace for electrically connecting the first conductive region and the second conductive region. Within the first conductive region, a first gap devoid of metal is provided, and the first inductive trace includes a first trace segment extending into the first gap. The first trace segment is disposed within the first gap at a distance from the first conductive region.

20 Claims, 9 Drawing Sheets

RADIATING ELEMENT FOR BASE STATION ANTENNA AND BASE STATION ANTENNA

CROSS-REFERENCE TO RELATED APPLICATION

The present application claims priority to Chinese Patent Application No. 202311092838.3, filed Aug. 28, 2023, the entire content of which is incorporated herein by reference as if set forth fully herein.

FIELD

The present disclosure relates to the field of radio communications and, more specifically, it pertains to a radiating element for a base station antenna and a base station antenna.

BACKGROUND

Cellular communication systems are well-known in this field. In a typical cellular communication system, a geographical area is divided into a series of regions called "cells," each served by a base station. The base station may include baseband equipment, radio equipment, and a base station antenna configured to provide bidirectional Radio Frequency (RF) communication with users located throughout the cell. Often, cells are further divided into multiple "sector" regions, with individual base station antennas providing coverage to each sector. Antennas are typically mounted on towers, and radiation beams ("antenna beams") generated by each antenna are directed outward to provide service to the corresponding sector. Usually, a base station antenna comprises one or more phased arrays of radiating elements, where the radiating elements are arranged in one or more vertical columns when the antenna is installed for use. In this context, "vertical" refers to the direction perpendicular to the horizontal plane defined by the horizon. Additionally, reference is made to the azimuth plane and the elevation plane, where the azimuth plane is the horizontal plane bisecting the base station antenna, and the elevation plane is the plane perpendicular to the azimuth plane extending along the direction of the antenna's line of sight.

A common base station configuration is the "three-sector" configuration, where the cell is divided into three 120° sectors in the azimuth plane. A base station antenna is provided for each sector. In the three-sector configuration, the antenna beams generated by each base station antenna typically have a Half Power Beamwidth (HPBW) of about 65° in the azimuth plane, ensuring good coverage of the entire 120° sector. Three such base station antennas provide complete 360° coverage in the azimuth plane. Typically, each base station antenna usually includes a so-called "linear array" of radiating elements, which comprises multiple radiating elements arranged in vertical columns. Each radiating element can have an azimuth HPBW of approximately 65°, resulting in the antenna beam generated by the linear array having an azimuth HPBW of about 65°. By providing a phased array of radiating elements extending along the elevation plane, the HPBW of the antenna beam in the elevation plane can be narrowed to a significantly smaller angle than 65°, with the amount of narrowing increasing with the length of the column in the vertical direction.

With the growth of cellular traffic, cellular operators have added new cellular services in various new frequency bands. When introducing these new services, it is often necessary to maintain existing "legacy" services to support older mobile devices. In some cases, "wideband" or "ultra-wideband" linear arrays of radiating elements can be used to support services in the new frequency bands. However, in other cases, additional linear arrays (or planar arrays) of radiating elements may need to be deployed to support services in the new frequency bands. Due to local zoning regulations and/or restrictions on weight and wind load, there is often a limitation on the number of base station antennas that can be deployed at a given base station. Therefore, to reduce the number of antennas, many operators deploy so-called "multi-band" base station antennas, which include multiple linear arrays of radiating elements communicating at different frequencies to support multiple different cellular services.

Traditionally, the low-frequency band extends between 696-960 MHz and supports several different frequency bands for cellular services in the low-frequency band range. Recently, the frequency band of 617-698 MHz has been opened for cellular services, leading to a demand for base station antennas comprising a wideband linear array of low-frequency band radiating elements spanning either the entire range of 617-960 MHz or at least the range of 617-896 MHz. These base station antennas often include two or more linear arrays of mid-frequency band radiating elements that operate in all or part of the 1427-2690 MHz frequency range that are installed very close to the low-frequency band linear array to achieve a compact antenna design. Unfortunately, due to the close proximity of the low-frequency band radiating elements and the mid-frequency band radiating elements in adjacent arrays, undesirable interactions may occur, which could negatively affect the antenna beam formed by the mid-frequency band linear array. For example, as mentioned above, the low-frequency band radiating elements can be designed to operate fully or partially within the frequency range of 617-960 MHz, while the mid-frequency band radiating elements can be designed to operate fully or partially within the frequency range of 1427-2690 MHz. When the low-frequency band radiating elements resonate at the wavelength of the mid-frequency band RF signal, unexpected interactions often happen between the low-frequency band radiating elements and the mid-frequency band radiating elements. This is particularly likely to occur when the mid-frequency band radiating elements transmit and receive signals at frequencies approximately twice the center frequency of the low-frequency band radiating elements' operating frequency. Under these conditions, the low-frequency band radiating elements (or components of the low-frequency band radiating elements) can respond to the mid-frequency band signal and resonate, inducing mid-frequency band currents, for example, on the dipole arms of the low-frequency band radiating elements. This type of interaction can result in scattering of the mid-frequency band RF signal, which can adversely affect at least some of the various characteristics of the mid-frequency band antenna beam, including azimuth and elevation beamwidths, beam tilt, antenna beam pointing angles, gain, front-to-back ratio, cross-polarization discrimination, etc. Additionally, the impact of the scattering may vary significantly with frequency, making it difficult to compensate for these effects using other techniques.

SUMMARY

The present disclosure relates to a radiating element for a base station antenna and a base station antenna capable of overcoming at least one defect in the prior art.

In one aspect, a radiating element for a base station antenna is provided, operable within a first frequency band. The radiating element includes a radiator comprising a first radiating arm and a second radiating arm. At least one of the first radiating arm and the second radiating arm includes a first conductive region, a second conductive region spaced apart from the first conductive region, and a first inductive trace for electrically connecting the first conductive region and the second conductive region. The first conductive region has a first gap devoid of metal within it, and the first inductive trace has a first trace segment extending into the first gap and spaced apart from the first conductive region.

In some examples, the first trace segment of the first inductive trace can be capacitively coupled to the first conductive region.

In some examples, a resonant LC circuit can be formed by the first inductive trace itself and the capacitively coupled first trace segment to the first conductive region. The LC resonant circuit is configured to allow current within a first frequency band to pass and at least partially suppress current within a second frequency band different from the first frequency band. Specifically, an LC resonant circuit is provided in at least one of the first radiating arm and the second radiating arm, comprising the first inductive trace and the capacitive coupling, configured to permit current within the first frequency band to pass and at least partially suppress current within the second frequency band different from the first frequency band.

In some examples, the first inductive trace can be capacitively coupled to the first conductive region through the first trace segment to form an LC resonant circuit. The LC resonant circuit is configured to suppress current within the second frequency band different from the first frequency band.

In some examples, the inductance value of the first inductive trace can be adjusted by altering the width, length, and/or path of the first inductive trace.

In some examples, the average width of the first inductive trace can be less than one-fifth of the average width of the first conductive region and/or the second conductive region.

In some examples, at least a portion of the first inductive trace can be configured to extend with bends.

In some examples, a first capacitor may be formed between the first trace segment and the first electrically conductive region.

In some examples, the first trace segment can form a first inductor, and the first inductor together with the first capacitor forms a first LC parallel resonant circuit.

In some examples, the first gap can have the same direction as the direction of the first trace segment.

In some examples, the first gap may be configured as a linearly extending gap or a folded extending gap, and/or the first trace segment may be configured as a straight extending trace segment or a folded extending trace segment.

In some examples, the end of the first trace segment can be physically connected to or spaced apart from the first conductive region.

In some examples, at least one of the first radiating arm and the second radiating arm can include a dielectric substrate having a first side where the first trace segment is located and a second side opposite to the first side, wherein the first additional coupling region capacitively couples with the first conductive region on the second side.

In some examples, the first trace segment can be electrically connected to the first additional coupling region via a first conductive structure passing through the dielectric substrate.

In some examples, the end of the first trace segment can be electrically connected to the first additional coupling region via a first conductive structure passing through the dielectric substrate.

In some examples, the first conductive structure may include metallized vias or conductive pins.

In some examples, the first inductive trace may have a second trace segment for directly physically connecting the first trace segment to a second conductive region.

In some examples, the second trace segment can be configured as a straight extending trace segment or a folded extending trace segment.

In some examples, a second gap with removed metal can be provided within the second conductive region, and the first inductive trace has a third trace segment extending into the second gap, with the third trace segment spaced apart from the second conductive region within the second gap.

In some examples, the third trace segment within the second gap can form a second capacitor with the second conductive region.

In some examples, the third trace segment can form a second inductor, and the second inductor, along with the second capacitor, forms a second LC parallel resonant circuit.

In some examples, the second gap can have a direction that matches the direction of the third trace segment.

In some examples, the third trace segment can be configured as a straight extending trace segment or a folded extending trace segment.

In some examples, the distal end of the third trace segment can be physically connected to or spaced apart from the second conductive region.

In some examples, at least one of the first radiating arm and the second radiating arm can include a dielectric substrate having a first side where the third trace segment is located and a second side opposite to the first side, wherein the second additional coupling region capacitively couples with the second conductive region on the second side.

In some examples, the third trace segment can be electrically connected to the second additional coupling region via a second conductive structure passing through the dielectric substrate.

In some examples, the end of the third trace segment can be electrically connected to the second additional coupling region via a second conductive structure passing through the dielectric substrate.

In some examples, the second conductive structure may include metallized vias or conductive pins.

In some examples, the first inductive trace has a fourth trace segment for directly physically connecting the first trace segment to the third trace segment.

In some examples, the fourth trace segment can be configured as a straight extending trace segment or a folded extending trace segment.

In some examples, at least one of the first radiating arm and the second radiating arm can include a second inductive trace spaced apart from the first inductive trace, for electrically connecting the first conductive region and the second conductive region.

In some examples, a third gap with removed metal can be provided within the first conductive region, and the second inductive trace has a first trace segment extending into the third gap, with the first trace segment of the second inductive trace spaced apart from the first conductive region within the third gap; and/or a fourth gap with removed metal can be provided within the second conductive region, and the second inductive trace has a second trace segment extending into the fourth gap, with the second trace segment of the second inductive trace spaced apart from the second conductive region within the fourth gap.

In some examples, the second inductive trace can be electrically connected to the first inductive trace, in parallel, between the first conductive region and the second conductive region.

In some examples, the radiating element can be a dual-polarized radiating element, wherein the dual-polarized radiating element comprises crossed dipole radiating elements and box-type dipole radiating elements.

According to a second aspect of the present disclosure, a base station antenna is provided, wherein the base station antenna comprises the radiating element described above for the base station antenna.

DETAILED DESCRIPTION

Figure 1A:
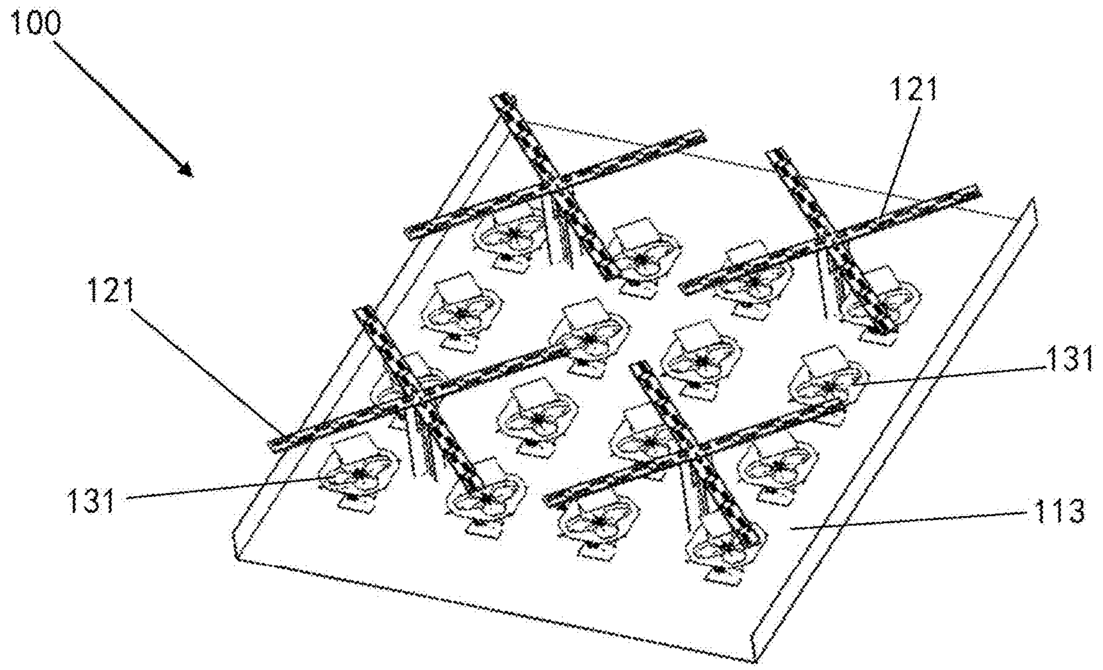
FIG. 1*a* is a schematic perspective view of a base station antenna according to some exemplary examples of the present disclosure, with the radome removed, wherein two first-band radiating element arrays and four second-band radiating element arrays are exemplarily shown.

The present disclosure relates to a radiation element 121 for a base station antenna 100. The radiation elements 121 operate within a first frequency band and each include radiators 10, 20. Radiator 10 includes a first radiating arm 11 and a second radiating arm 12, and radiator 20 includes a third radiating arm 13 and a fourth radiating arm 14. At least one of the first radiating arm 11 and the second radiating arm 12 includes: a first conductive region 232-1; a second conductive region 232-2, spaced apart from the first conductive region 232-1; and a first inductive trace 234-1 for electrically connecting the first conductive region 232-1 and the second conductive region 232-2. The first conductive region 232-1, the second conductive region 232-2 and the first inductive trace may each comprise metal patterns. Within the first conductive region 232-1, a first gap 235-1 is provided where the metal is omitted. The first inductive trace 234-1 includes a first trace segment S11 extending into the first gap 235-1, with the first trace segment S11 being capacitively coupled to the first conductive region 232-1 and arranged within the first gap 235-1 to be spaced apart from the first conductive region 232-1.

According to the technical solution for the radiation element for a base station antenna 100 disclosed herein, by providing a first gap 235-1 with removed metal within the first conductive region 232-1 and extending the first trace segment S11 of the first inductive trace 234-1 into the first gap 235-1, the first inductive trace 234-1 can be capacitively coupled to the first conductive region 232-1 through its first trace segment S11, forming a resonant circuit by this capacitive coupling and the inherent properties of the first inductive trace 234-1. This resonant circuit can be approximated or considered to be an LC resonant circuit 200 within the first frequency band, as shown in FIGS. 3*b*, 5*b*, 6*b*, and 7*b*. It should be understood that the resonant circuit may also have other forms of parasitic capacitance and/or parasitic inductance, but they are neglected due to their small numerical values. In some examples, the LC resonant circuit 200 can be configured to allow current to pass within the first frequency band while partially suppressing current within a second frequency band different from the first frequency band. By introducing the LC resonant circuit 200 into the radiating arm of the first frequency band radiation element 121, it is possible to selectively and at least partially suppress currents induced on the radiating arms 11-14 of the first frequency band radiation element 121 within the second frequency band, effectively reducing or eliminating scattering effects of the first frequency band radiation element 121 on the second frequency band radiation element 131. This effectively enhances the radiation performance of the second frequency band radiation element 131. Further details are described in FIGS. 1*a* to 8. For case of understanding, the same reference numerals are used for the same components in FIGS. 1*a* to 8.

Figure 1B:
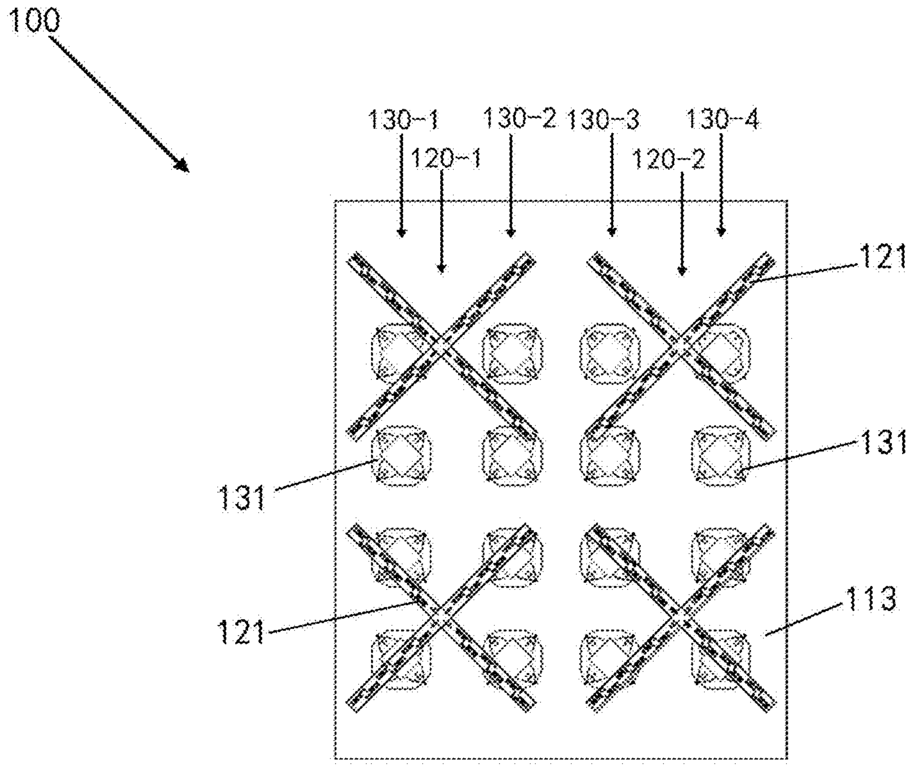
FIG. 1*b* a schematic front view of the base station antenna of FIG. 1*a*.

FIG. 1*a* shows a schematic perspective view of a base station antenna 100 according to some examples of the present disclosure, with the radome removed. The base station antenna 100 may include multiple, for example, two first band radiation elements 121 in arrays 120-1, 120-2, and multiple, for example, four second band radiation elements 131 in arrays 130-1, 130-2, 130-3, 130-4. FIG. 1*b* shows a front view of the base station antenna 100 from FIG. 1*a*.

As shown in FIG. 1*a* and FIG. 1*b*, multiple radiation elements 121, 131 are mounted on the front side of a reflector 113 of the base station antenna 100. Each radiation element 121, 131 extends forward from the front surface of the reflector 113. The reflector 113 can be used as a ground plane structure for the radiation elements 121, 131. The radiation elements 121, 131 can include first band radiation elements 121 (in this exemplary case, low band radiation elements) and second band radiation elements 131 (in this exemplary case, high band radiation elements), where the first band radiation elements 121 extend further forward than the second band radiation elements 131. The first band radiation elements 121 cover a frequency range, for example, from 617 MHz to 960 MHz or one or more portions thereof. The second band radiation elements 131 cover a frequency range, for example, from 3 GHz to 5 GHz or one or more portions thereof. It should be understood that the radiation elements 121, 131 could also be mid-band radiation elements (covering a frequency range, for example, from 1427 MHz to 2690 MHz or one or more portions thereof).

In the examples illustrated in FIGS. 1*a* and 1*b*, the first band radiation elements 121 are installed in two columns to form two linear arrays, 120-1 to 120-2 of first band radiation elements 121. The second band radiation elements 131 are installed in four columns to form four linear arrays 130-1 to 130-4 of second band radiation elements 131. It should be noted that similar elements in this document can be individually referred to by their complete reference numerals (e.g., linear array 130-1), or collectively referred to by the first part of their reference numerals (e.g., linear array 130) as indicated.

In some other examples not shown, the quantity of the first band radiation element 121 and/or the second band radiation element 131, as well as their linear arrays 120, 130, may differ from the quantities shown in FIGS. 1*a* and 1*b*. The linear arrays 120, 130 can be arranged in any suitable mutual positional relationship and can extend either partially or along the entire length of the base station antenna 100. In the following description, the first band radiation element 121 is exemplified for illustrative purposes. However, it is to be understood that the technical content described below can be applicable to the second band radiation element 131 and/or radiation elements of other band types within the understanding of those skilled in the art in this field.

Figure 2A:
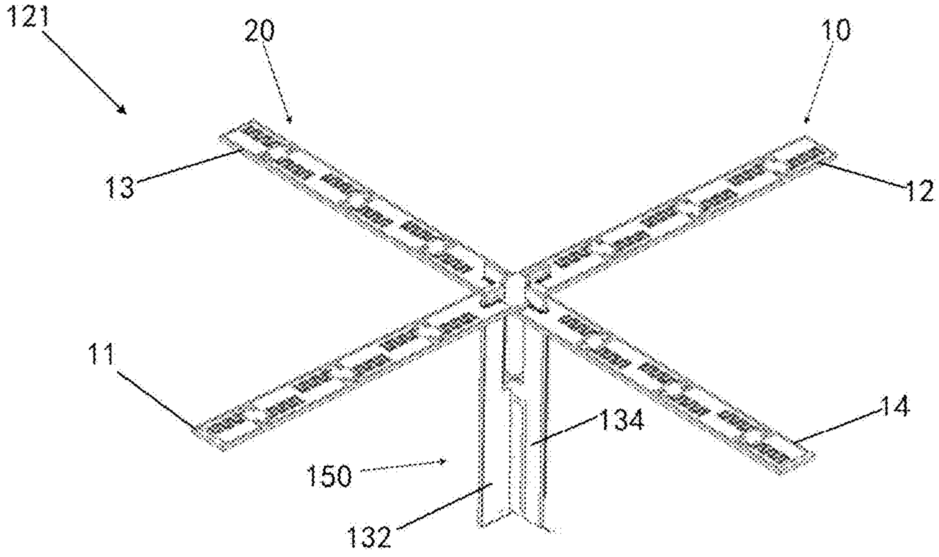
FIG. 2*a* is a perspective view of one of the first-band radiating elements in the base station antenna of FIGS. 1*a* and 1*b*.
Figure 2B:
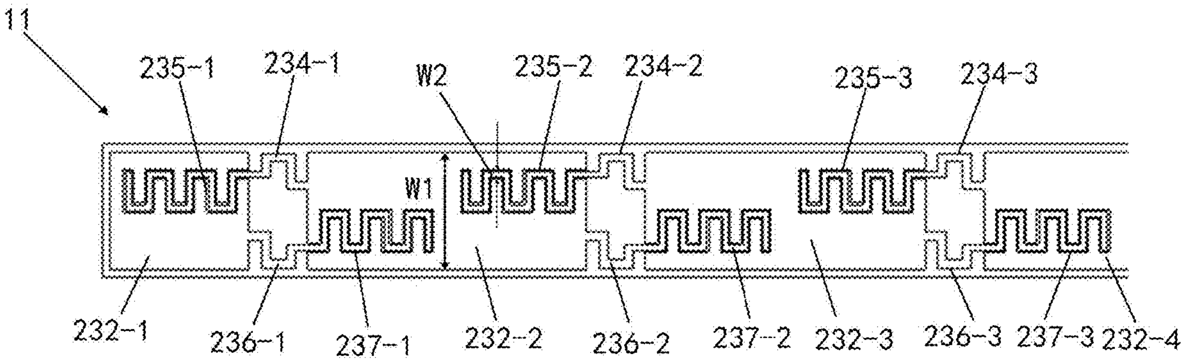
FIG. 2*b* is a partially enlarged front view of a radiator arm of a radiating element from FIG. 2*a*.
Figure 2C:
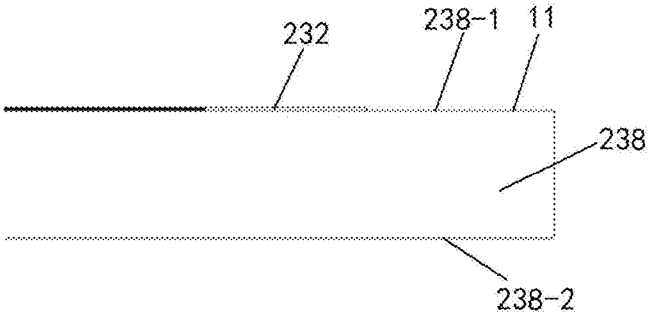
FIG. 2*c* is a partially enlarged side view of the radiator arm from FIG. 2*b*.

FIG. 2*a* is a perspective view of one of the first band radiating elements 121 of the base station antenna 100 of FIGS. 1*a* and 1*b*. FIG. 2*b* is an enlarged front view of a portion of the radiator arm 11 of radiator 10 of the first band radiating element 121 of FIG. 2*a*. FIG. 2*c* is an enlarged side view of the radiator arm 11 of FIG. 2*b*.

As shown in FIG. 2*a*, the first band radiating element 121 can be a crossed dipole radiating element, wherein the crossed dipole radiating element comprises a first radiator 10 and a second radiator 20 arranged in a cross configuration, and includes a feed column 150. The first radiator 10 comprises radiator arms 11 and 12 and can be configured to transmit and receive radio frequency signals along a first polarization direction, such as the +45° polarization direction. The second radiator 20 comprises radiator arms 13 and 14 and can be configured to transmit and receive radio frequency signals along a second polarization direction, such as the −45° polarization direction. The feed column 150 includes a first feed column printed circuit board 132 for feeding the first radiator 10 and grounding the first radiator 10, and a second feed column printed circuit board 134 for feeding the second radiator 20 and grounding the second radiator 20. Furthermore, the feed column 150 is also used to mount the first radiator 10 and the second radiator 20 at an appropriate distance in front of the reflector 113 of the base station antenna 100. In some examples, the first radiator 10 and the second radiator 20 are mounted via the feed column 150 at a distance approximately between 3/16 to 1/4 of the operating wavelength in front of the reflector 113.

FIG. 2*b* is an enlarged front view of a portion of the radiator arm 11 of the first radiator 10 of FIG. 2*a*. The other radiator arms 12 to 14 of the first band radiating element 121 can be constructed similarly to the radiator arm 11 and hence are not separately depicted.

As shown in FIG. 2*a* to FIG. 2*c*, the radiator arm 11 can comprise a dielectric substrate 237 (see FIG. 2*c*), where the dielectric substrate 237 has a first side 237-1 (referred to as the front side in this text) and a second side 237-2 (referred to as the back side in this text) opposite the first side 237-1. The front side of the dielectric substrate 237 is equipped with multiple conductive regions 232-1 to 232-4, which are electrically connected by corresponding inductive traces 234-1 to 234-3 and 236-1 to 236-3. The radiator arm 11 includes four conductive regions 232-1 to 232-4, and adjacent conductive regions 232-1 to 232-4 are electrically connected by corresponding inductive traces 234-1 to 234-3 and 236-1 to 236-3. In each conductive region 232-1 to 232-4, there are provided gaps 235-1 to 235-3 and 237-1 to 237-3 where the metal is omitted. Corresponding inductive traces 234-1 to 234-3 and 236-1 to 236-3 have trace segments extending into the gaps 235-1 to 235-3 and 237-1 to 237-3. The trace segments are spaced apart from the corresponding conductive regions 232-1 to 232-4 and disposed within the respective gaps 235-1 to 235-3 and 237-1 to 237-3. As a result, each inductive trace 234-1 to 234-3 and 236-1 to 236-3 can capacitively couple with the corresponding conductive regions 232-1 to 232-4 to form an LC resonance circuit 200 for at least suppressing currents within the second frequency band.

As shown in FIG. 2*b*, each electrically conductive region 232-1~232-4 may have a respective width W1, wherein the width W1 is measured in a direction generally perpendicular to the current flow direction along the respective electrically conductive region 232-1 to 232-4. The width W1 of each conductive region 232-1 to 232-4 need not be constant. Similarly, each of the sensory traces 234-1 to 234-3, 236-1 to 236-3 may have a width W2, wherein each of the widths W2 are measured in a direction generally perpendicular to the transient current flow direction along the respective sensory traces 234-1 to 234-3, 236-1 to 236-3. The width W2 of each of the sensory traces 2234-1 to 234-3 and 236-1 to 236-3 also need not be constant. In some examples, the average width of the sensory traces 234-1 to 234-3, 236-1 to 236-3 can be set to be less than the average width of the electrically conductive region 232-1 to 232-4 electrically connected thereto, and in particular, may be set less than one fifth, one eighth, or one tenth, the average width of the respective electrically conductive region 232-1 to 232-4 electrically connected thereto. That is, the sensory traces 234-1 to 234-3 and 236-1 to 236-3 may be set to be narrower than the electrically conductive regions 232-1 to 232-4 electrically connected thereto. Such narrower sensory traces 234-1 to 234-3, 236-1 to 236-3 can be used as high impedance conductive traces.

As shown in FIG. 2*b*, a portion of the trace segments of the sensory traces 234-1 to 234-3, 236-1 to 236-3 extend into the gaps 235-1 to 235-3, 237-1 to 237-3 of the conductive region 232-1 to 232-4. In some examples, more than 40%, 50%, and 60% of the sensory traces 234-1 to 234-3, 236-1 to 236-3 of the trace segments extend into the gaps 235-1 to 235-3 and 237-1 to 237-3 of the conductive region 232-1 to 232-4. As a result, even if the corresponding inductive traces 234-1 to 234-3, 236-1 to 236-3 and/or gaps 235-1 to 235-3, 237-1 to 237-3 are set to be longer, for example, to achieve larger inductance and/or capacitance values, the adjacent conductive regions 232-1 to 232-4 can still be arranged in close proximity to each other, so that the four conductive regions 232-1 to 232-4 collectively appear as a single radiating arm to radio frequency signals at frequencies within the operating frequency range of the first frequency band radiating element 121. For this purpose, alternatively or additionally, at least a portion of the inductive traces 234-1 to 234-3, 236-1 to 236-3 may be configured as meandered conductive traces. Gaps for accommodating these meandered portions of the conductive traces may also be configured as extended gaps for the bends. Here, meandered conductive traces refer to non-straight conductive traces that follow bending paths to increase their path length. The use of meandered conductive traces 234-1 to 234-3, 236-1 to 236-3 allows not only for altering (here, increasing) the inductance values of the inductive traces 234-1 to 234-3, 236-1 to 236-3 but also provides a convenient way to extend the length of the inductive traces 234-1 to 234-3, 236-1 to 236-3 while maintaining inductive traces with a small physical footprint. Due to the small physical footprint of the inductive traces 234-1 to 234-3, 236-1 to 236-3, adjacent conductive regions 232-1 to 232-4 can be positioned close to each other.

Figure 3A:
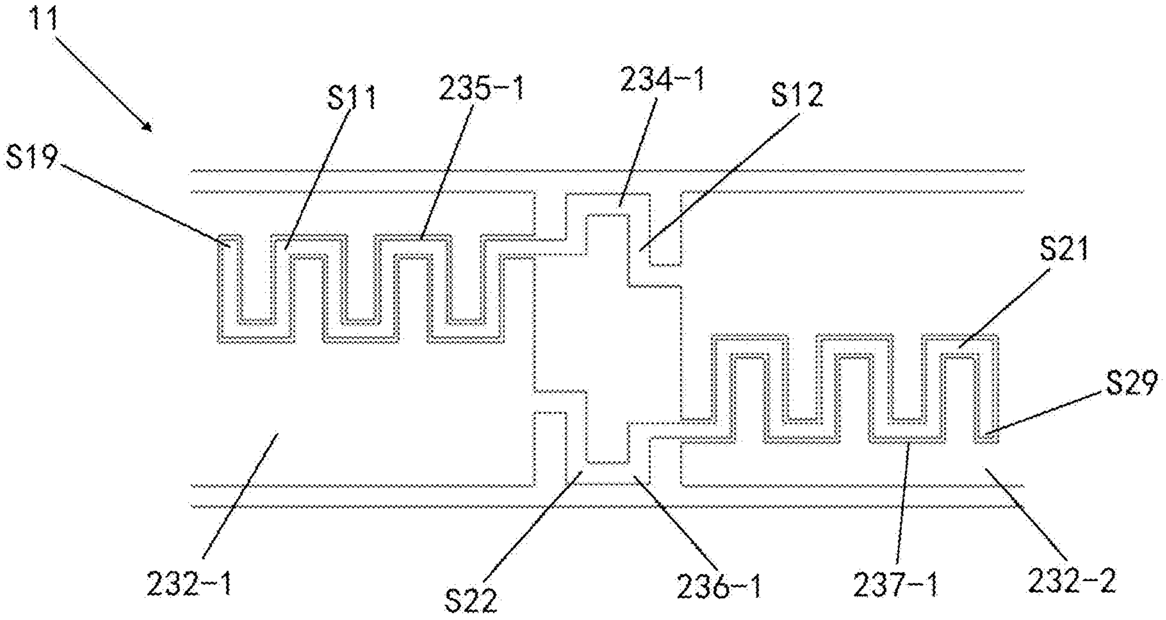
FIG. 3*a* is a further partially enlarged front view of the radiator arm from FIG. 2*b*, illustrating a first conductive region, a second conductive region, a first inductive trace, and a second inductive trace arranged between the first and second conductive regions.
Figure 3B:
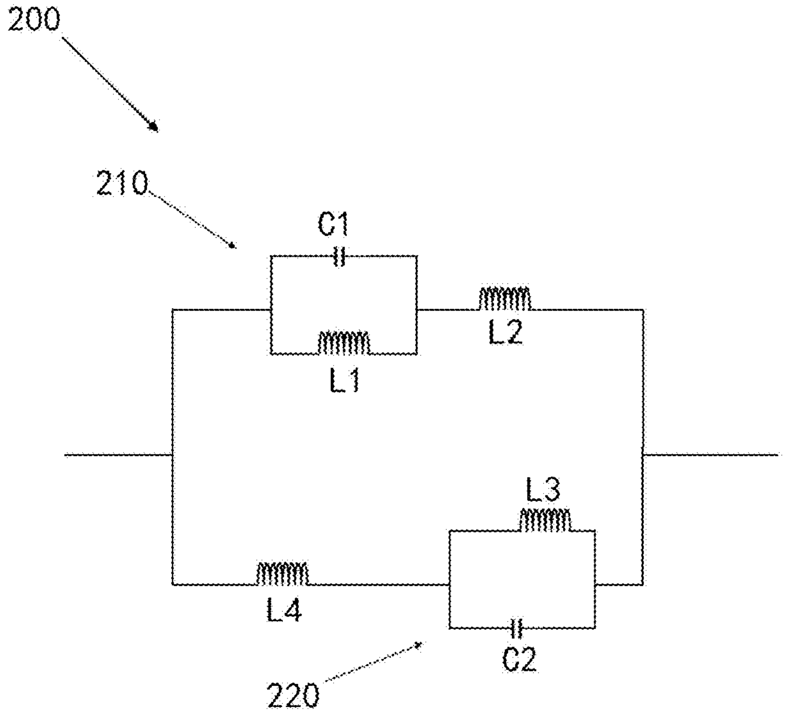
FIG. 3*b* is a schematic diagram of an LC resonant circuit formed by the first and second inductive traces and the first and second conductive regions from FIG. 3*a*.

A further enlarged front view of the radiation arm 11 of FIG. 2*b* is shown in FIG. 3*a*, which illustrates the first conductive region 232-1, the second conductive region 232-2, and the first inductive trace 234-1 and second inductive trace 236-1 positioned between the first conductive region 232-1 and the second conductive region 232-2 of the radiation arm 11. FIG. 3*b* a schematic diagram of the LC resonant circuit 200 formed by the first inductive trace 234-1, second inductive trace 236-1, first conductive region 232-1, and second conductive region 232-2 shown in FIG. 3*a*.

As illustrated in FIG. 3*a*, the radiation arm 11 comprises the first conductive region 232-1 and the second conductive region 232-2 spaced apart from the first conductive region 232-1, including the first inductive trace 234-1 and the second inductive trace 236-1 for electrically connecting the first conductive region 232-1 and the second conductive region 232-2. A first gap 235-1 devoid of metal is provided within the first conductive region 232-1. The first inductive trace 234-1 includes a first trace segment S11 extending into the first gap 235-1 and a second trace segment S12 positioned between the first conductive region 232-1 and the second conductive region 232-2. The second trace segment S12 can be physically connected to the second conductive region 232-2. The first trace segment S11 of the first inductive trace 234-1 is spaced apart from the first conductive region 232-1 and disposed within the first gap 235-1. In some examples, as illustrated in FIG. 3*a*, the first trace segment S11 of the first inductive trace 234-1 can be configured as a meandered-extending trace segment. The end S19 of the first trace segment S11 can be spaced apart from (see FIG. 3*a*, FIG. 6*a*) or physically connected to (see IG. 7*a*) the first conductive region 232-1. The first gap 235-1 can have a direction that is the same as the direction of the first trace segment S11, that is, it is configured as a meandered-extending first gap 235-1. The second trace segment S12 of the first inductive trace 234-1 can be physically connected to the second conductive region 232-2. The second trace segment S12 of the first inductive trace 234-1 can be configured as a meandered-extending trace segment.

Similar to the first conductive region 232-1, a gap 237-1 with removed metal can be provided within the second conductive region 232-2. Similar to the first inductive trace 234-1, a second inductive trace 236-1 can include a first trace segment S21 extending into the gap 237-1 and a second trace segment S22 positioned between the first conductive region 232-1 and the second conductive region 232-2. Skilled artisans in the field can understand that the second inductive trace 236-1 can be configured similarly to the first inductive trace 234-1, as shown in FIG. 3*a*, and further details are not reiterated here.

As shown in FIG. 3*b*, the first inductive trace 234-1 and the second inductive trace 236-1 can cooperate with the first conductive region 232-1 and the second conductive region 232-2 to form an LC resonant circuit 200 between them. Specifically, a first capacitor C1 can be formed between a first trace segment S11 of the first inductive trace 234-1 and the first conductive region 232-1. The first trace segment S11 of the first inductive trace 234-1 can itself form a first inductor L1, and together with the first capacitor C1, they can form a first LC parallel resonant circuit 210. The second trace segment S12 of the first inductive trace 234-1 can form a second inductor L2. The second inductor L2 is set in series with the first LC parallel resonant circuit 210, arranged in between the first conductive region 232-1 and the second conductive region 232-2. Similarly, the first trace segment S21 of the second inductive trace 236-1 can form a second capacitor C2 with the second conductive region 232-2. The first trace segment S21 of the second inductive trace 236-1 forms a third inductor L3, and together with the second capacitor C2, they form a second LC parallel resonant circuit 220. The second trace segment S22 of the second inductive trace 236-1 forms a fourth inductor L4. The fourth inductor L4 is set in series with the second LC parallel resonant circuit 220, arranged between the first conductive region 232-1 and the second conductive region 232-2.

The total inductance value of the first inductive trace 234-1 can be adjusted by changing the width W2, length, and/or orientation of the first inductive trace 234-1. Specifically, the inductance value of the first inductor L1 can be adjusted by changing the width, length, and/or orientation of the first trace segment S11 of the first inductive trace 234-1. The inductance value of the second inductor L2 can be adjusted by changing the width, length, and/or orientation of the second trace segment S12 of the first inductive trace 234-1. The inductance value of the third inductor L3 can be adjusted by changing the width, length, and/or orientation of the first trace segment S21 of the second inductive trace 236-1. The inductance value of the fourth inductor LA can be adjusted by changing the width, length, and/or orientation of the second trace segment S22 of the second inductive trace 236-1. Additionally, the capacitance value of the first capacitor C1 can be adjusted by changing the width, length, and/or orientation of the first gap 235-1, and/or by changing the width, length, and/or orientation of the first trace segment S11 of the first inductive trace 234-1. The capacitance value of the second capacitor C2 can be adjusted by changing the width, length, and/or orientation of the gap 237-1, and/or by changing the width, length, and/or orientation of the first trace segment S21 of the second inductive trace 233-1.

By appropriately adjusting the inductance values of the first inductor L1 through the fourth inductor L4 and adjusting the capacitance values of the first capacitor C1 through the second capacitor C2, the LC resonant circuit 200 can be configured to at least suppress currents within a second frequency band different from a first frequency band. In other words, the LC resonant circuit 200 can be designed to present high impedance to currents within the second frequency band while not significantly affecting the ability of currents within the first frequency band to flow on the radiating arm. As a result, the LC resonant circuit 200 can reduce second frequency band currents induced on the first frequency band radiating element 121 and mitigate subsequent interference to the radiation pattern of nearby second frequency band radiating element 131. In some examples, the LC resonant circuit 200 can be configured to allow currents within the first frequency band to pass while blocking currents within the second frequency band. In other words, the LC resonant circuit 200 can render the nearby second frequency band radiation element 131 almost invisible to the first frequency band radiation element 121, thereby potentially preventing distortion of the radiation pattern of the second frequency band antenna by the first frequency band radiation element 121.

Figure 4A:
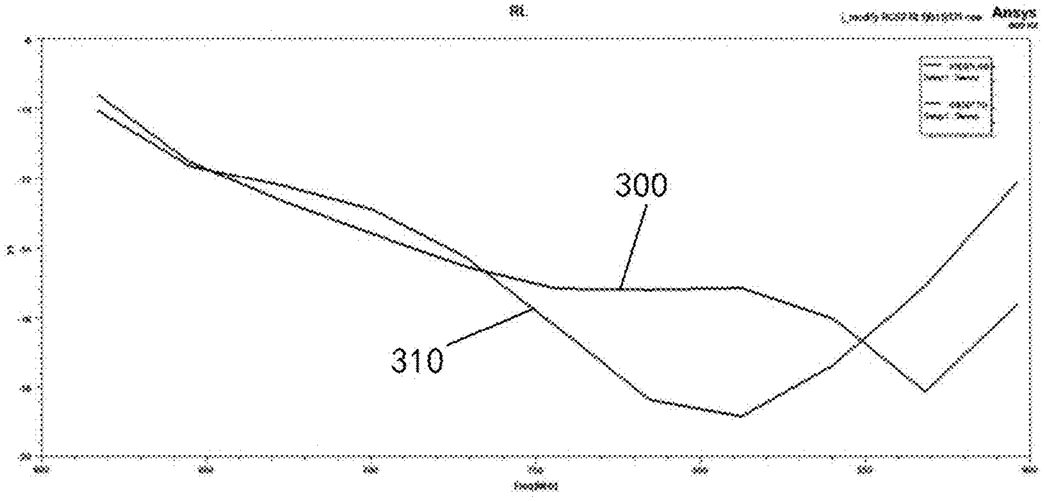
FIG. 4*a* is a graph illustrating simulated return loss of the first-band radiating elements from FIG. 2*a*.
Figure 4B:
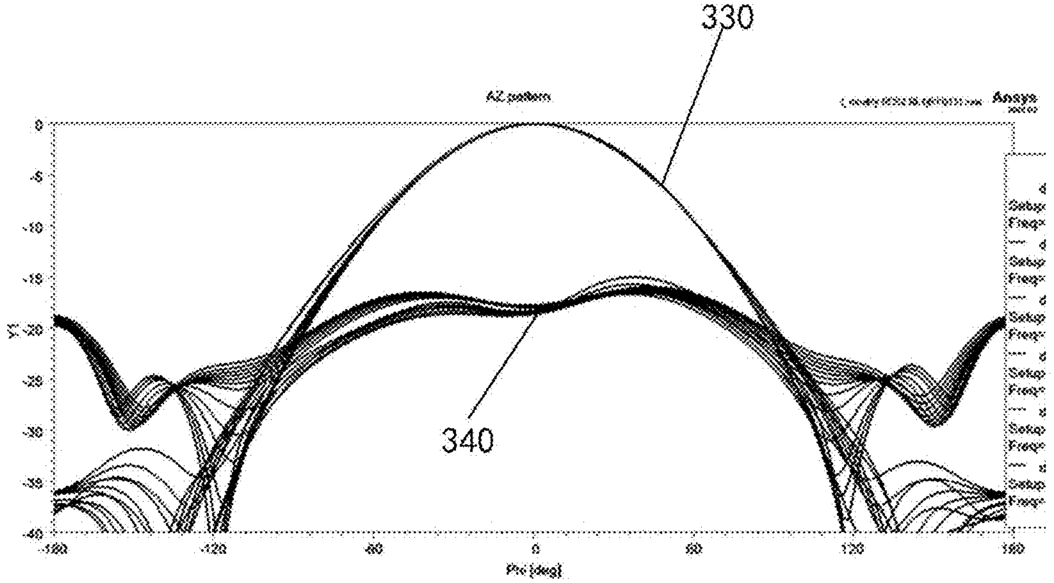
FIG. 4*b* is a simulated azimuth pattern of the first-band radiating elements from FIG. 2*a*.

FIG. 4*a* illustrates a graph of the simulated return loss of the first band radiation element 121 of FIG. 2*a*. FIG. 4*b* illustrates the simulated azimuthal radiation pattern of the first frequency band radiation element 121 o FIG. 2*a*.

As shown in FIG. 4*a*, within the 617-896 MHz operating frequency range of the first frequency band radiation element 121, the return loss (curves 300 and 310) of the two orthogonal polarized radiators 10 and 20 of the first frequency band radiation element 121 varies between approximately −12 dB and −19 dB. This demonstrates sufficient impedance matching for the first frequency band radiation element 121. The curves labeled as 330 in FIG. 4*b* represent the main polarization, while the curves labeled as 340 represent the cross polarization. Multiple curves are included in FIG. 4*b* to display the performance at different selected frequencies within the 617-896 MHz operating band of the first frequency band radiation element 121. As can be seen in FIG. 4*b*, the multiple curves are comparatively concentrated, indicating the strong convergence performance of the first frequency band radiation element 121. Furthermore, the first frequency band radiation element 121 generates an antenna beam with an appropriate azimuth beamwidth (approximately) 65°, featuring low sidelobes and good cross polarization discrimination.

Figure 5A:
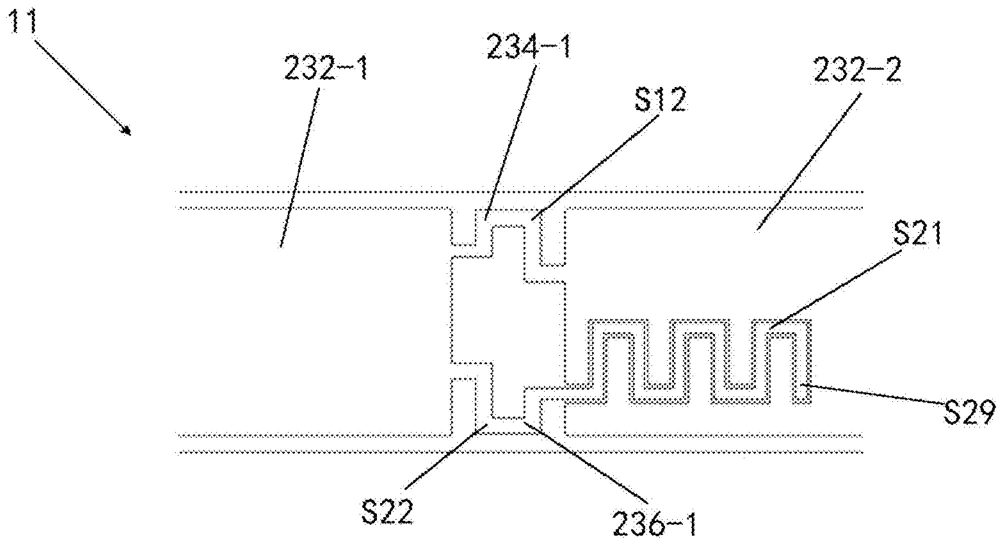
FIG. 5*a* is a partially enlarged front view of a radiator arm of a first-band radiating element according to other exemplary examples of the present disclosure, with a different first inductive trace compared to FIG. 3*a*.
Figure 5B:
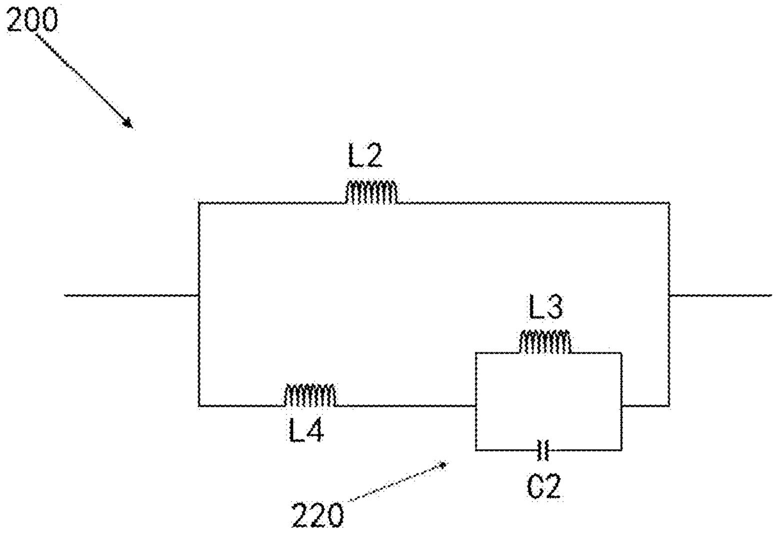
FIG. 5*b* is a schematic diagram of an LC resonant circuit formed by the first and second inductive traces and the first and second conductive regions from FIG. 5*a*.

FIG. 5*a* presents an enlarged front view of a portion of radiator arm 11 of radiator 10 of the first frequency band radiation element 121 according to further examples of the present disclosure. The primary difference from FIG. 3*a* is the presence of a different first trace line 234-1. FIG. 5*b* illustrates a schematic diagram of the LC resonant circuit 200 formed by the first trace line 234-1 and the second trace line 236-1 with the first conductive region 232-1 and the second conductive region 232-2 of FIG. 5*a*.

The main difference from the example shown in FIG. 3*a* is that in the example of radiator arm 11 shown in FIG. 5*a*, no first gap with removed metal is provided within the first conductive region 232-1. Accordingly, the first trace line 234-1 does not include a first trace segment S11 that extends into the first gap 235-1. Instead, it only includes a second trace segment S12 positioned between the first conductive region 232-1 and the second conductive region 232-2.

Therefore, in the LC resonant circuit 200 shown in FIG. 5*b*, the first LC parallel resonant circuit 210 shown in FIG. 3*b* is omitted, and the first trace line 234-1 can be equivalent to or can be regarded as a second inductor L2 connected between the first conductive region 232-1 and the second conductive region 232-2. Since the radiator arm 11 can be identical to the one discussed earlier in all other respects, further description is omitted.

Figure 6A:
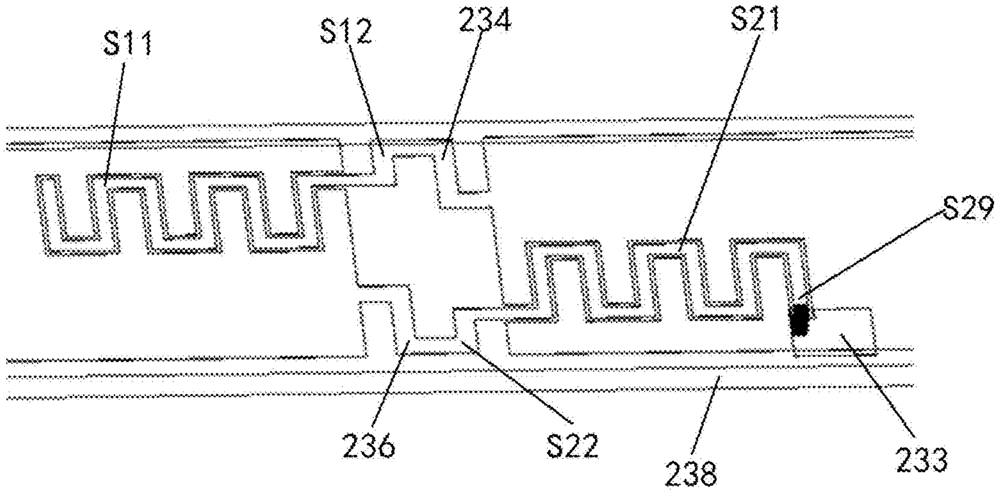
FIG. 6*a* is a partially enlarged front perspective view of a radiator arm of a first-band radiating element according to other exemplary examples of the present disclosure, with an additional coupling region shown on the backside of the dielectric substrate, differing from FIG. 3*a*.
Figure 6B:
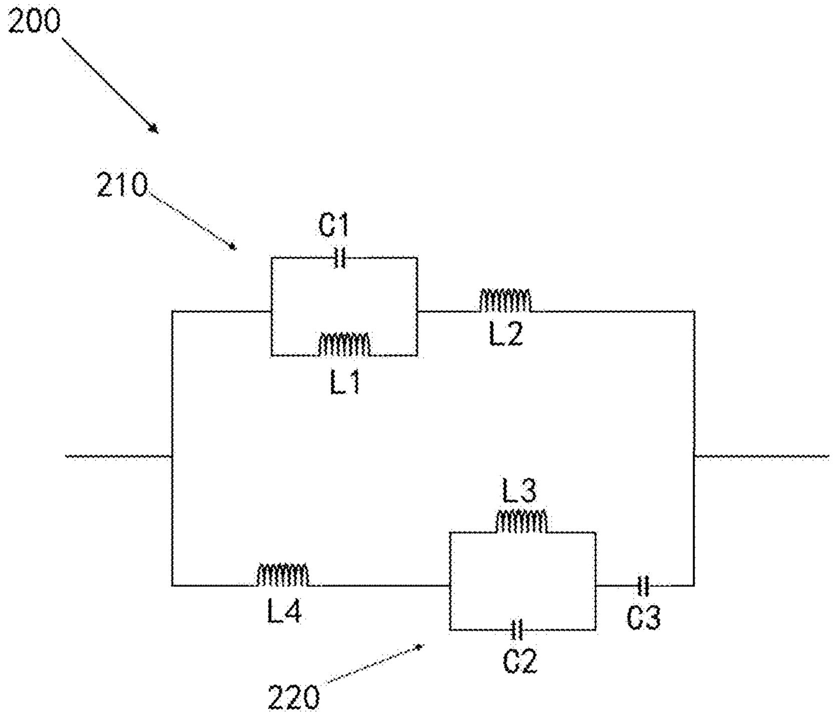
FIG. 6*b* is a schematic diagram of an LC resonant circuit formed by the first and second inductive traces, the first and second conductive regions, and the additional coupling region from FIG. 6*a*.

FIG. 6*a* is an enlarged front perspective view of a portion of radiating arm 11 of the radiator 10 of a radiating element 121 in a first frequency band according to another example of the present disclosure. The difference from FIG. 3*a* is that an additional coupling region 233 set on the back side of dielectric substrate 238 is additionally shown. The additional coupling region is connected to the first trace segment S21 of the second trace 236-1 via, for example, a plated through hole that extends through the dielectric substrate 237. FIG. 6*b* illustrates a schematic diagram of the LC resonant circuit 200 formed by the first inductive trace 234-1 and the second inductive trace 236-1 in FIG. 6*a*, along with the first conductive region 232-1, the second conductive region 232-2, and the additional coupling region 233.

A main difference from the example shown in FIG. 3*a* is that in the example of radiating arm 11 shown in FIG. 6*a*, an additional coupling region 233 is capacitively coupled to the second conductive region 232-2 on the second side 238-2 (back side) of dielectric substrate 238 of radiating arm 11. The first trace segment S21 of the second inductive trace 236-1 can be electrically connected to the additional coupling region 233 via the first conductive structure that passes through the dielectric substrate 238. In FIG. 6*a*, the end S29 of the first trace segment S21 of the second inductive trace 236-1 can be electrically connected to the additional coupling region 233 via the first conductive structure that passes through the dielectric substrate 238. Here, the first conductive structure may include metallized vias or conductive pins.

As a result, in the LC resonant circuit 200 shown in FIG. 6*b*, a third capacitor C3 is serially connected in addition to the second LC parallel resonant circuit 220 shown in FIG. 3*b*. Since radiating arm 11 can be the same as the radiating arm 11 discussed above in other aspects, further description thereof is omitted.

It should be understood that, in some examples not explicitly shown, optionally or additionally, an additional coupling region may be set up on the second side (back side) 238-2 of the dielectric substrate 238 of the radiation arm 11, which is capacitively coupled to the first conductive region 232-1. Therefore, an additional capacitor is effectively connected in series with the first LC parallel resonant circuit 210 shown in FIG. 3*b*.

Figure 7A:
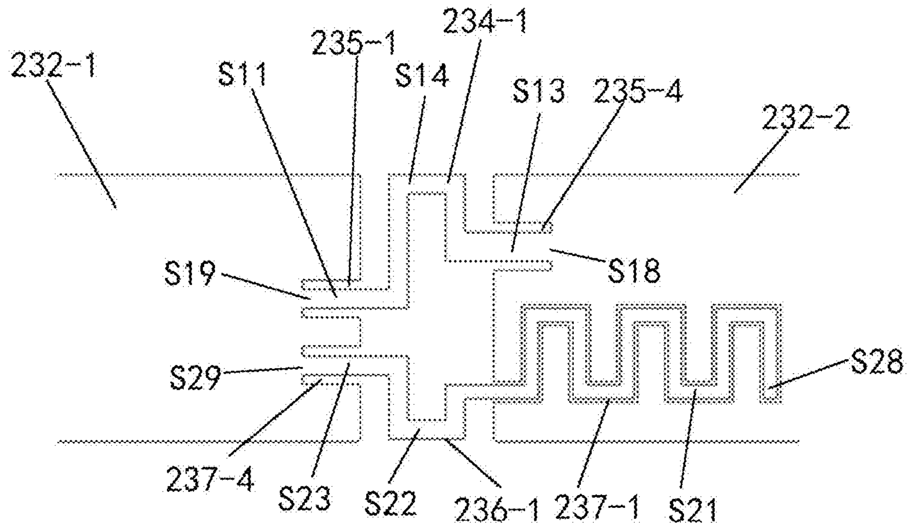
FIG. 7*a* is a partially enlarged front view of a radiator arm of a first-band radiating element according to other exemplary examples of the present disclosure, with different first and second inductive traces compared to FIG. 3*a*.
Figure 7B:
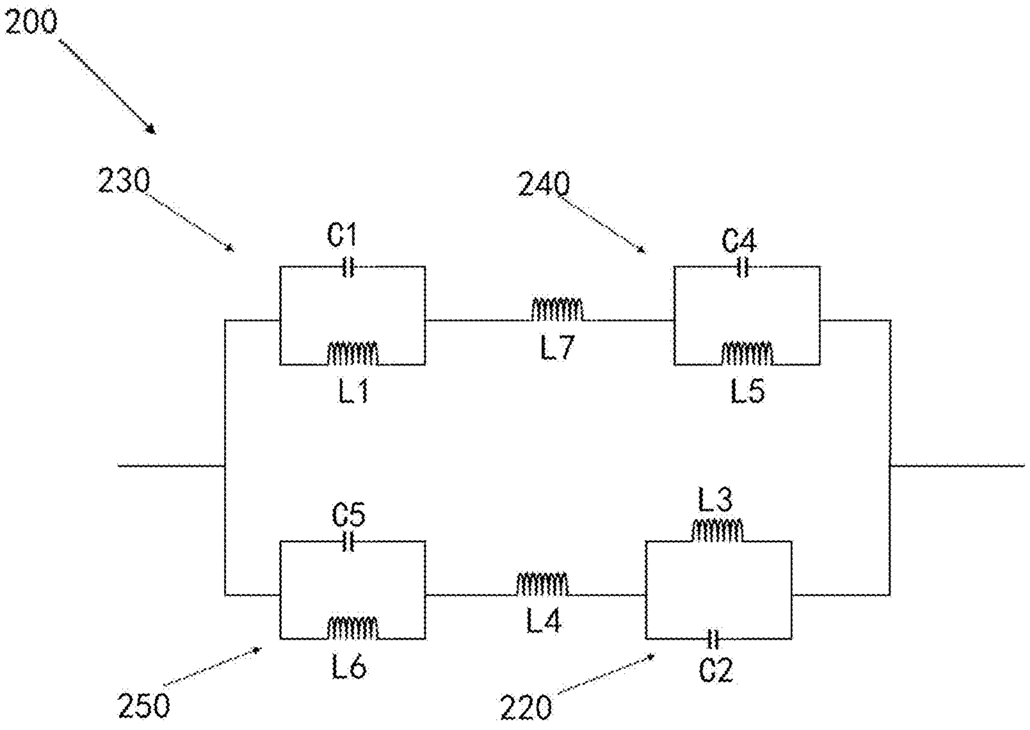
FIG. 7*b* is a schematic diagram of an LC resonant circuit formed by the first and second inductive traces and the first and second conductive regions from FIG. 7*a*.

FIG. 7*a* shows an enlarged front view of a portion of a radiator arm 11 of a radiator 10 of a first frequency band radiation element 121 according to some other examples of the present disclosure. The main difference from FIG. 3*a* is the depiction of different first trace 234-1 and second trace 236-1 for the first inductance and second inductance, respectively. FIG. 7*b* illustrates a schematic diagram of the LC resonant circuit 200 formed by the first conductive region 232-1 and the second conductive region 232-2, along with the first trace 234-1 and the second trace 236-1 shown in FIG. 7*a*.

A significant difference from the example shown in FIG. 5*a* is that, in the example of the radiation arm 11 shown in FIG. 7*a*, a first gap 235-1 without metal is provided within the first conductive region 232-1. The first trace 234-1 has a first trace segment S11 extending into the first gap 235-1, and the first trace segment S11 is spaced apart from the first conductive region 232-1 and disposed within the first gap 235-1. The first trace segment S11 can be a straight extended trace segment. The end S19 of the first trace segment S11 can be physically connected to the first conductive region 232-1. Additionally, a second gap 235-4 without metal is provided within the second conductive region 232-2, and the second gap 235-4 can be a linearly extended gap. The first trace 234-1 has a third trace segment S13 extending into the second gap 235-4, and the third trace segment S13 of the first trace 234-1 is spaced apart from the second conductive region 232-2 and disposed within the second gap 235-4. The third trace segment S13 of the first trace 234-1 can be a straight extended trace segment. The end S18 of the third trace segment S13 of the first trace 234-1 can be physically connected to the second conductive region 232-2. Furthermore, the first trace 234-1 has a fourth trace segment S14 for directly connecting the first trace segment S11 to the third trace segment S13. The fourth trace segment S14 can be a straight extended trace segment (not shown) or a meandered extended trace segment (see FIG. 7*a*). Similarly, a gap 237-4 without metal can be provided within the first conductive region 232-1, and the second trace 236-1 can have a third trace segment S23 extending into the gap 237-4. The third trace segment S23 of the second trace 236-1 is spaced apart from the first conductive region 232-1 and disposed within the gap 237-4. The third trace segment S23 of the second trace 236-1 can be a straight extended trace segment (see FIG. 7*a*) or a meandered extended trace segment (not shown). The end S29 of the third trace segment S23 can be physically connected to the first conductive region 232-1. Since the radiation arm 11 can be similar to the radiation arm discussed above in other aspects, its further description is omitted.

Therefore, in the LC resonant circuit 200 shown in FIG. 7*b*, an additional inductor L7 formed by the fourth trace segment S14 shown in FIG. 7*a* replaces the second inductor L2 in FIG. 5*b*. The two ends of the inductor L7 are connected in series to additional LC parallel resonant circuits 230 and 240, and one end of the fourth inductor LA in FIG. 5*b* is connected in series to an additional LC parallel resonant circuit 250. Here, the LC parallel resonant circuit 220 is formed by the third inductor L3 and the second capacitor C2 in parallel. The LC parallel resonant circuit 230 is formed by the first inductor L1 and the first capacitor C1 in parallel. The LC parallel resonant circuit 240 is formed by a fifth inductor L5 and a fourth capacitor C4 in parallel. The LC parallel resonant circuit 250 is formed a sixth inductor L6 and a fifth capacitor C5 in parallel.

Figure 8:
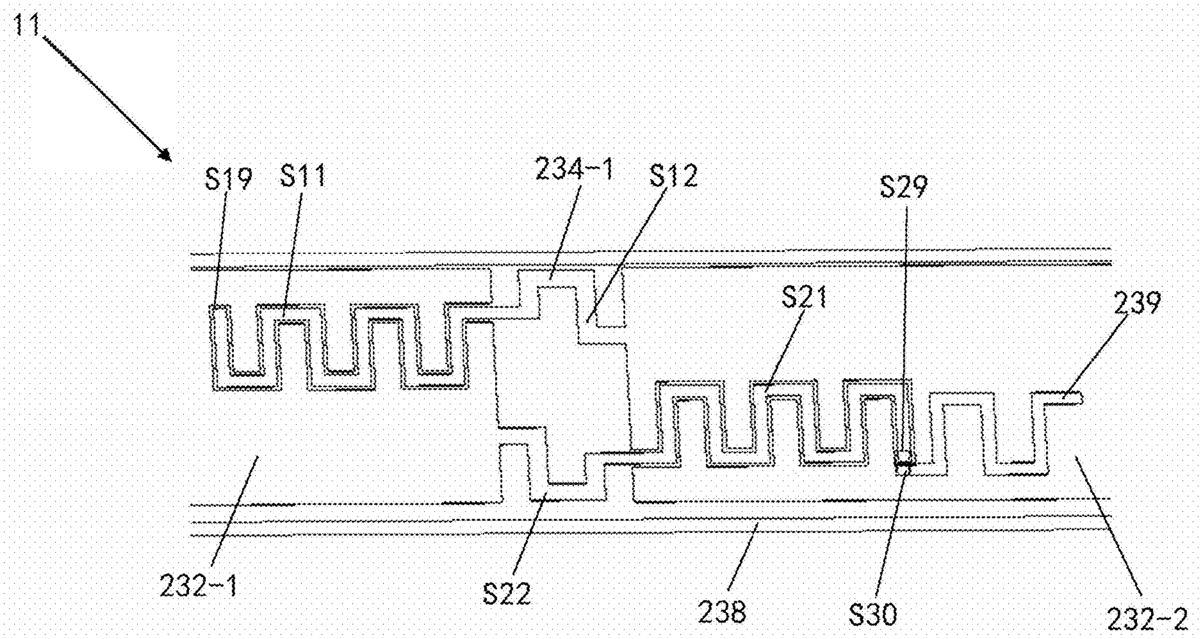
FIG. 8 is a partially enlarged front perspective view of a radiator arm of a first-band radiating element according to other exemplary examples of the present disclosure, with an additional inductive trace shown on the backside of the dielectric substrate, differing from FIG. 3*a*.

FIG. 8 shows a partially enlarged front perspective view of a radiator arm 11 of a first-band radiating element 121 according to other exemplary examples of the present disclosure, with an additional inductive trace 239 shown on the backside of the dielectric substrate 238, differing from FIG. 3*a*.

A main difference from the example shown in FIG. 3*a* is that in the example of radiating arm 11 shown in FIG. 8, an additional inductive trace 239 is provided on the second side 238-2 (in this case, on the back side) of the dielectric substrate 238 of radiation arm 11. The first trace segment S21 of the second inductive trace 236-1 can be galvanically connected to the additional inductive trace 239 through a third conductive structure passing through the dielectric substrate 238. In FIG. 8, the end S29 of the first trace segment S21 of the second inductive trace 236-1 can be galvanically connected to the end S30 of the additional inductive trace 239 through a third conductive structure passing through the dielectric substrate 238. Here, the third conductive structure may include metallized vias or conductive pins.

As a result, in the LC resonant circuit 200 (not shown) corresponding to FIG. 8, an additional inductor is serially connected in addition to the second LC parallel resonant circuit 220 shown in FIG. 3*b*. As a result, the inductance can be further enhanced. Since radiating arm 11 can be the same as the radiating arm 11 discussed above in other aspects, further description thereof is omitted.

As shown in FIG. 8, the additional inductive trace 239 on the back side of the dielectric substrate 238 can extend in the same direction as the second inductive trace 236-1 on the front side of the dielectric substrate 238. Alternatively, the additional inductive trace 239 can extend in the opposite direction to the second inductive trace 236-1, in other words, it can be folded back underneath the second inductive trace 236-1.

It should be understood that, alternatively or additionally, an additional inductive trace galvanically connected to the first inductive trace 234-1 can be provided on the second side 238-2 (here, the back side) of the dielectric substrate 238 of the radiation arm 11.

Figure 9:
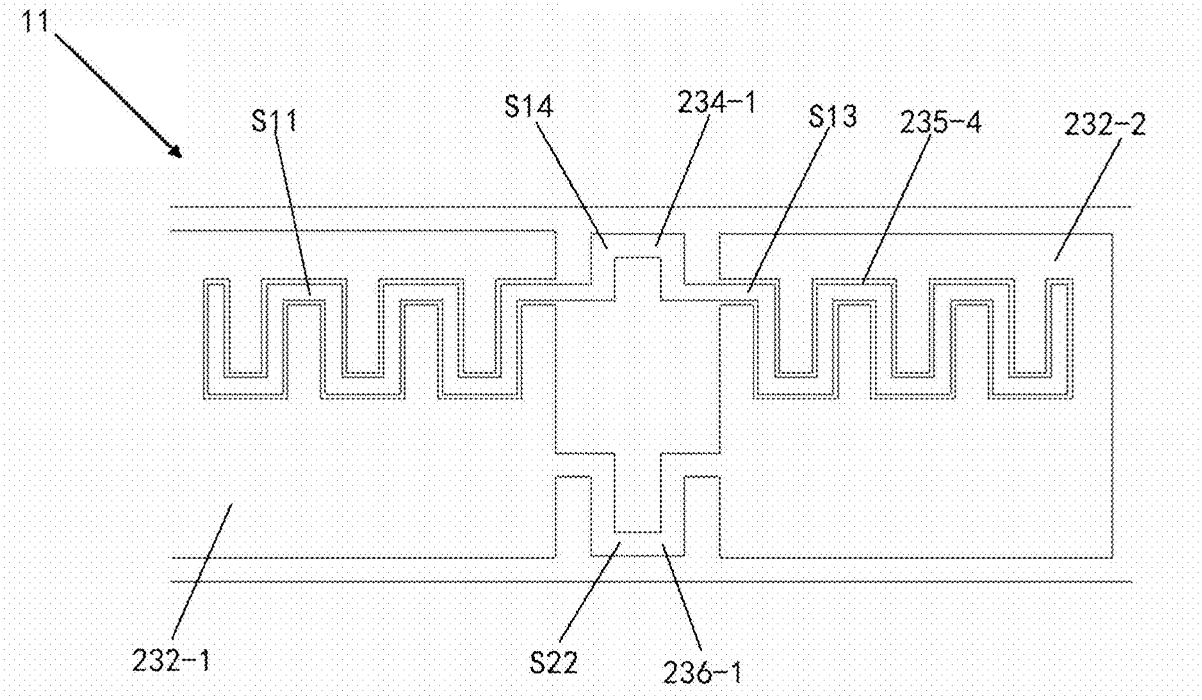
FIG. 9 is a partially enlarged front perspective view of a radiator arm of a first-band radiating element according to other exemplary examples of the present disclosure, with different first and second inductive traces compared to FIG. 3*a*.

FIG. 9 shows a partially enlarged front perspective view of a radiator arm 11 of a first-band radiating element 121 according to other exemplary examples of the present disclosure, with different first and second inductive traces compared to FIG. 3*a*.

A main difference from the example shown in FIG. 3*a* is that in the example of radiating arm 11 shown in FIG. 9, the first trace 234-1 has a third trace segment S13 extending into the second gap 235-4, and the third trace segment S13 of the first trace 234-1 is spaced apart from the second conductive region 232-2 and disposed within the second gap 235-4. The third trace segment S13 of the first trace 234-1 can be a meandered extended trace segment. The end S18 of the third trace segment S13 of the first trace 234-1 can be physically connected to the second conductive region 232-2. Furthermore, the first trace 234-1 has a fourth trace segment S14 for directly connecting the first trace segment S11 to the third trace segment S13. The fourth trace segment S14 can be a straight extended trace segment (not shown) or a meandered extended trace segment (see FIG. 9).

In the embodiment of FIG. 9, another difference from the embodiment shown in FIG. 3*a* is that the second inductive trace 236-1 only has a second trace segment S22 located between the first conductive region 232-1 and the second conductive region 232-2. It should be understood that in the embodiment of FIG. 9, the second inductive trace 236-1 can also be constructed similarly to the first inductive trace 234-1.

Figure 10:
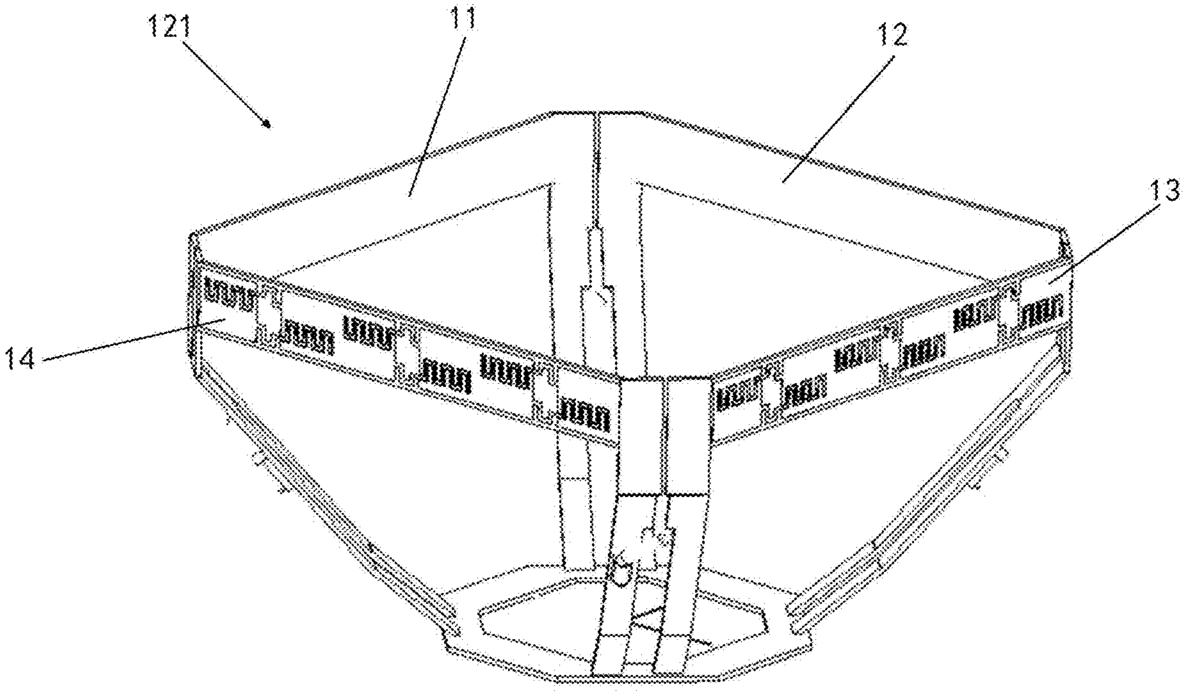
FIG. 10 is a perspective view of a first-band radiating element according to other exemplary examples of the present disclosure.

FIG. 10 is a perspective view of a first band radiation element 121 according to other examples of the present disclosure. Unlike the example of FIG. 2*a*, as shown in FIG. 10, the first band radiation element 121 can be constructed as a box-type dipole radiation element. The box-type dipole radiation element may have four radiation arms 11 to 14 in a box-like configuration, at least one of the four radiation arms 11 to 14 can be constructed similarly to the radiation arm 11 in the examples described above. Since the radiation arms 11 to 14 can be identical to the radiation arm 11 discussed above in other aspects, their further description is omitted.

It should be recognized that, in addition to the cross-type dipole radiation element 121 shown in FIG. 2*a* and the box-type dipole radiation element 121 shown in FIG. 10, other radiation elements can be used to implement the base station antenna 100 in other examples. For example, in other examples, the aforementioned cross-type dipole radiation element 121 or box-type dipole radiation element 121 can be replaced with a non-illustrated annular radiation element. Any other suitable type of radiation element can also be used. Similarly, it should also be understood that the first band radiation element 121 in the linear array 120-1 to 120-2 does not necessarily have to be a low band radiation element, but can be a radiation element operating in other frequency bands.

Although examples of including a total of two inductive traces 234 and 236 to connect each pair of adjacent conductive regions 232 in the exemplary radiation arms 11 to 14 have been shown in the above examples, it should be understood that any number of inductive traces (or other types of inductive traces) can be used, including three inductive traces, four inductive traces, five inductive traces, six inductive traces, etc. Furthermore, it should be understood that different numbers of inductive traces can be used to connect each pair of adjacent conductive regions 232.

While exemplary examples of the present disclosure have been described, those skilled in the art should understand that various changes and modifications can be made to the exemplary examples of the present disclosure without departing from the essence and scope of the present disclosure. Therefore, all changes and modifications are encompassed within the scope of protection of the present disclosure as defined by the appended claims. The present disclosure is defined by the appended claims, and their equivalents are also included.

The invention claimed is:

1. A radiating element for a base station antenna that is configured to operate within a first frequency band, the radiating element comprising: a radiator, wherein the radiator includes a first radiating arm and a second radiating arm, wherein at least one of the first radiating arm and the second radiating arm comprises: a first conductive region, a second conductive region, spaced apart from the first conductive region, a first inductive trace for electrically connecting the first conductive region and the second conductive region, wherein a first gap devoid of metal is provided within the first conductive region, the first inductive trace has a first trace segment extending into the first gap, and the first trace segment is disposed within the first gap at a spaced-apart distance from the first conductive region.

2. The radiating element of claim 1, wherein the first trace segment of the first inductive trace is capacitively coupled to the first conductive region.

3. The radiating element of claim 2, wherein an LC resonant circuit is formed by the first inductive trace itself and the capacitive coupling between the first trace segment and the first conductive region, the LC resonant circuit configured to allow current to pass within the first frequency band while at least partially suppressing current within a second frequency band different from the first frequency band.

4. The radiating element of claim 1, wherein an average width of the first inductive trace is less than one-fifth of an average width of the first conductive region and/or the second conductive region.

5. The radiating element of claim 1, wherein at least a portion of the first inductive trace is meandered.

6. The radiating element of claim 1, wherein a first capacitor is formed between the first trace segment and the first conductive region.

7. The radiating element of claim 6, wherein the first trace segment forms a first inductor, and the first inductor and the first capacitor form a first LC parallel resonant circuit.

8. The radiating element of claim 1, wherein the first gap has a direction that is the same as the direction of the first trace segment.

9. The radiating element of claim 1, wherein at least one of the first radiating arm and the second radiating arm comprises a dielectric substrate, and the dielectric substrate has a first side where the first trace segment is located and a second side opposite the first side, wherein a first additional coupling region capacitively coupled to the first conductive region is arranged on the second side.

10. The radiating element of claim 9, wherein the first trace segment is electrically connected to the first additional coupling region via a first conductive structure through the dielectric substrate.

11. The radiating element of claim 10, wherein the first conductive structure comprises metallized vias or conductive pins.

12. The radiating element of claim 1, wherein the first inductive trace has a second trace segment for directly physically connecting the first trace segment to the second conductive region.

13. The radiating element of claim 1, wherein a second gap devoid of metal is provided within the second conductive region, and the first inductive trace has a third trace segment extending into the second gap, wherein the third trace segment is arranged in the second gap at a distance from the second conductive region.

14. The radiating element of claim 13, wherein a second capacitor is formed between the third trace segment and the second conductive region.

15. The radiating element of claim 14, wherein the third trace segment forms a second inductor, and the second inductor and the second capacitor form a second LC parallel resonant circuit.

16. The radiating element of claim 13, wherein at least one of the first radiating arm and the second radiating arm comprises a dielectric substrate, and the dielectric substrate has a first side where the third trace segment is located and a second side opposite to the first side, wherein a second additional coupling region capacitively coupled to the second conductive region is arranged on the second side.

17. The radiating element of claim 1, wherein at least one of the first radiating arm and the second radiating arm comprises a second inductive trace spaced apart from the first inductive trace, for electrically connecting the first conductive region and the second conductive region.

18. The radiating element of claim 17, wherein a third gap devoid of metal is provided within the first conductive region, and the second inductive trace has a first trace segment extending into the third gap, wherein the first trace segment of the second inductive trace is arranged in the third gap at a distance from the first conductive region; and/or a fourth gap devoid of metal is provided within the second conductive region, and the second inductive trace has a second trace segment extending into the fourth gap, wherein the second trace segment of the second inductive trace is arranged in the fourth gap at a distance from the second conductive region.

19. The radiating element of claim 17, wherein the second inductive trace and the first inductive trace are connected to each other in parallel between the first conductive region and the second conductive region.

20. The radiating element of claim 1, wherein the radiating element is a dual-polarization radiating element, and the dual-polarization radiating element includes a crossed dipole radiating element and a box dipole radiating element.

* * * * *